(12) United States Patent
Knoblauch

(10) Patent No.: US 8,257,214 B2
(45) Date of Patent: Sep. 4, 2012

(54) DRIVE TRAIN FOR A MOTOR VEHICLE

(75) Inventor: Daniel Knoblauch, Untergruppenbach (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/955,819

(22) Filed: Nov. 29, 2010

(65) Prior Publication Data

US 2011/0136609 A1 Jun. 9, 2011

Related U.S. Application Data

(63) Continuation of application No. PCT/EP2009/002128, filed on Mar. 24, 2009.

(30) Foreign Application Priority Data

Jun. 11, 2008 (DE) .......................... 10 2008 029 287

(51) Int. Cl.
*F16H 3/72* (2006.01)
*F16H 37/06* (2006.01)
*B60K 6/445* (2007.10)
*B60K 1/00* (2006.01)

(52) U.S. Cl. ............... 475/5; 475/4; 475/9; 180/65.235; 180/65.6; 180/65.7

(58) Field of Classification Search .................. 475/4, 5, 475/9; 180/65.21–65.26
See application file for complete search history.

(56) References Cited

U.S. PATENT DOCUMENTS

3,352,373 A * 11/1967 Tuck ............................. 180/243
5,513,719 A 5/1996 Moroto et al.
(Continued)

FOREIGN PATENT DOCUMENTS

DE 199 17 724 A1 11/2000
(Continued)

OTHER PUBLICATIONS

English Translation of International Preliminary Report on Patentability; Application No. PCT/EP2009/002128; Filed Mar. 24, 2009.

*Primary Examiner* — Tisha Lewis
(74) *Attorney, Agent, or Firm* — Knobbe, Martens, Olson & Bear, LLP

(57) ABSTRACT

A drive train for a motor vehicle, which has a first and a second axle. The drive train has a first drive unit for permanently driving the first axle and an electric drive unit, which is arranged in the region of the second axle and has an electric motor. A shift clutch package contains a first shift clutch for setting up a first transmission ratio and a second shift clutch for setting up a second transmission ratio between the electric motor and an output of the electric drive unit. The electric drive unit is arranged parallel to an input shaft of a transverse differential of the second axle.

17 Claims, 6 Drawing Sheets

U.S. PATENT DOCUMENTS

| | | | |
|---|---|---|---|
| 5,620,387 | A | 4/1997 | Janiszewski |
| 6,864,652 | B2 * | 3/2005 | Kubo et al. .................. 318/362 |
| 6,880,664 | B2 * | 4/2005 | Pecnik et al. ................. 180/243 |
| 7,040,433 | B2 * | 5/2006 | Yamamoto et al. ...... 180/65.225 |
| 7,240,748 | B2 * | 7/2007 | Kira et al. ................. 180/65.25 |
| 7,455,612 | B2 * | 11/2008 | Teraoka ........................ 475/151 |
| 7,661,495 | B2 * | 2/2010 | Zohrer et al. .............. 180/65.22 |
| 2005/0109549 | A1 * | 5/2005 | Morrow ........................ 180/65.2 |
| 2007/0093341 | A1 | 4/2007 | Supina |
| 2009/0127059 | A1 * | 5/2009 | Knoblauch ................ 192/84.92 |
| 2009/0211824 | A1 * | 8/2009 | Knoblauch et al. .......... 180/65.7 |

FOREIGN PATENT DOCUMENTS

| | | |
|---|---|---|
| DE | 103 19 108 A1 | 4/2003 |
| DE | 10 2006 010 616 A1 | 8/2007 |
| EP | 0 409 610 A1 | 1/1991 |
| EP | 1 506 890 A1 | 2/2005 |
| EP | 1 526 027 A2 | 4/2005 |
| EP | 1 571 751 A1 | 9/2005 |
| JP | 2008-256007 | 10/2008 |
| WO | WO 2007/085348 A1 | 8/2007 |

* cited by examiner

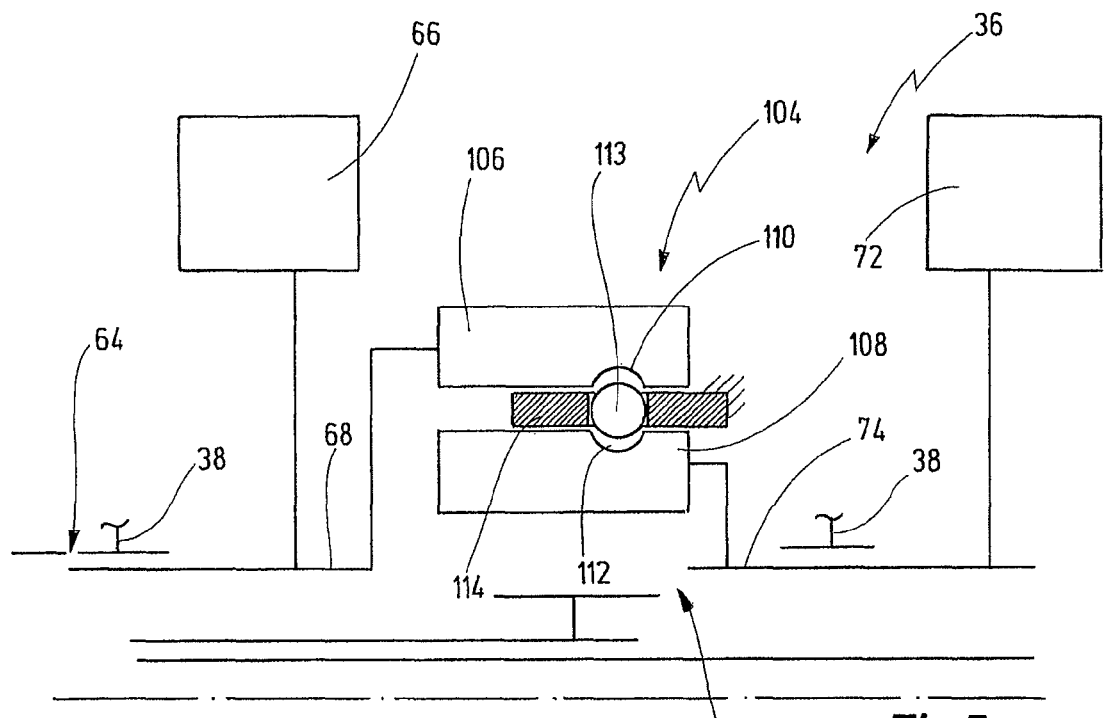
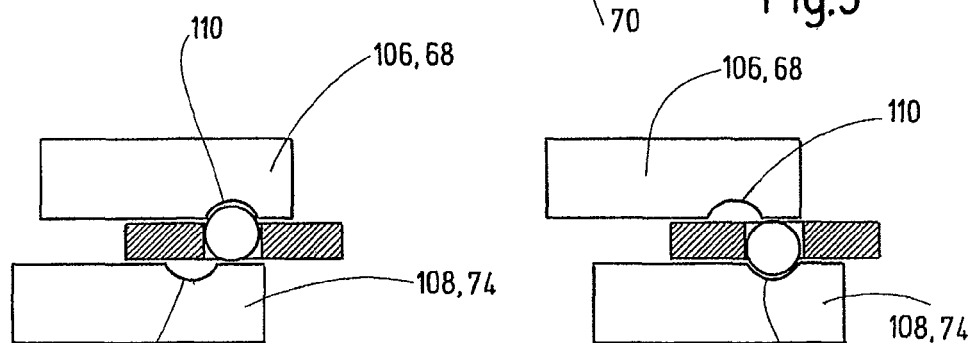
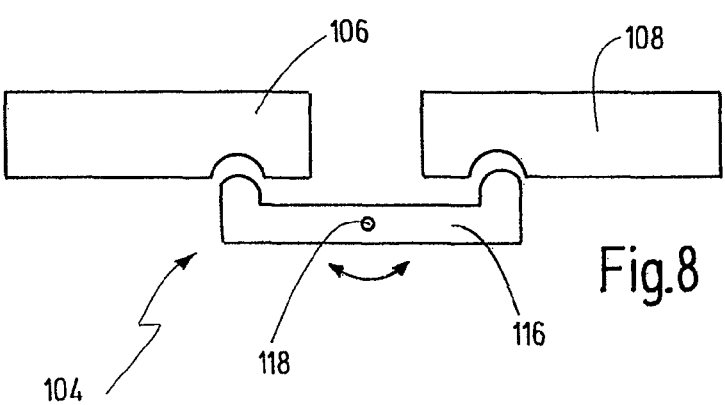

DRIVE TRAIN FOR A MOTOR VEHICLE

CROSS-REFERENCE TO RELATED APPLICATIONS

This is a Continuation application of International patent application PCT/EP 2009/002128, filed Mar. 24, 2009, which claims the priority of German patent application DE 10 2008 029 287 filed Jun. 11, 2008.

BACKGROUND OF THE INVENTION

The present invention relates to a drive train for a motor vehicle, which has a first and a second axle, said drive train having a first drive unit for permanently driving the first axle and an electric drive unit, which is arranged in the region of the second axle and has an electric motor.

A drive train of this kind is known from document DE 103 19 108 A1, for example.

The present invention furthermore relates to a shift clutch arrangement for connecting two rotational bodies that can be rotated relative to one another, for use in a drive train of this kind.

In the motor vehicle sector, especially in the passenger vehicle sector, there is a trend towards all-wheel-drive vehicles, on which both the first and the second axle can be supplied with drive power. In conventional versions, this is accomplished mechanically by way of a transfer case, which distributes the drive power to the first and the second axle.

The transfer case can, for example, have a longitudinal differential, which distributes the drive power in a fixed ratio to the two axles, or a hang-on coupling, by means of which the drive power is fed to one of the two axles only when required.

Another trend in the motor vehicle sector is for hybrid drive trains, which have both an internal combustion engine and an electric machine. One practice that is known in this context (e.g. from the abovementioned document DE 103 19 108 A1) is to drive the first axle by means of the drive unit which has an internal combustion engine and to drive the second axle by means of an electric machine.

In this case, the electric machine is arranged in the region of the second axle and can be aligned parallel to an input shaft of a transverse differential of the second axle.

Systems in which an electric machine is arranged in the region of the first drive unit and the power provided by the electric machine is transmitted to the second axle via a cardan shaft are also known.

In this case, the electric machine is often designed only for a particular speed or torque range.

In the case of shift clutches used in such drive trains, there is the disadvantage, on the one hand, that the said clutches have to be actuated by dedicated motors or by hydraulic means. Moreover, detection of the respective shift state selected is often problematic.

BRIEF SUMMARY OF THE INVENTION

Against this background, it is the object of the invention to specify a hybrid drive train for an all-wheel-drive motor vehicle in which the drive train can be integrated in a favourable manner in terms of installation space and the electric machine can be used over a wide operating range.

It is furthermore the object of the invention to specify an improved shift clutch arrangement for a drive train of this kind.

According to a first aspect of the invention, this object is achieved by a drive train for a motor vehicle which has a first and a second axle, said drive train having a first drive unit for permanently driving the first axle and an electric drive unit, which is arranged in the region of the second axle and has an electric motor and a shift clutch package, which contains a first shift clutch for setting up a first transmission ratio and a second shift clutch for setting up a second transmission ratio between the electric motor and an output of the electric drive unit, the electric drive unit being arranged parallel, in particular coaxially, to an input shaft of a transverse differential of the second axle.

Integrating a shift clutch package having a first and a second shift clutch for setting up different transmission ratios into the electric drive unit is a measure which allows the electric drive unit to be used over a wide operating range.

Moreover, good utilization of installation space and good drive train weight distribution is obtained. In addition, the second axle with the transverse differential can be made substantially identical to a conventional all-wheel version of the vehicle which is already in series production.

In the present context, the term "connect" shall mean that two components are either connected rigidly in a direct manner or, alternatively, in an indirect manner. A "connection" is therefore intended to be understood to mean that power can flow via the connection. Depending on the context, the term "arranged" is intended to be understood both spatially and in such a way that power can flow via the arrangement thus created.

In the present context, the term "electric motor" is furthermore intended to refer to an electric machine which can operate both in motor mode and in generator mode.

In the present case, a "differential" will be understood to mean either a mechanical differential, such as a bevel gear differential, or a twin clutch arrangement, in which the wheels on the associated axle are supplied with power via independent friction clutches.

The electric drive unit preferably has just one output, allowing the overall design to be embodied in a simple manner.

The above object is thus achieved in full.

The output of the electric drive unit is preferably connected in a rigid or torsionally rigid manner to the input shaft of the transverse differential. This makes it possible to transmit the drive power provided by the electric motor directly to the second axle. In this embodiment, it is not absolutely necessary to provide a cardan shaft between the first and the second axle. The power from the first drive unit and that from the electric drive unit can be combined "via the road".

It is preferable here if the output of the electric drive unit is connected via a coupling to an oil pump for supplying fluid to the electric drive unit.

In general, it is preferred here if the oil pump for supplying fluid (in particular for lubrication) is of integral construction with the electric drive unit. The coupling can be a rigid connection but, ideally, it is a coupling of integral construction with the electric drive unit and, in other versions of the drive train, can also be used as a hang-on coupling (e.g. when the first axle and the second axle are connected to one another via a cardan shaft).

According to another preferred embodiment, the output of the electric drive unit can be connected via a friction clutch to an input shaft of the transverse differential.

In this embodiment, it is possible to supply the power provided by the electric motor to the second axle only when required. However, it is also possible here, if appropriate, for the output power of the electric motor to be supplied to the first axle via a cardan shaft (e.g. in order to start an internal combustion engine of the first drive unit or the like at that location).

It is furthermore advantageous if the output of the electric drive unit is connected via a friction clutch to a cardan shaft, which is connected to the first drive unit.

In this embodiment, the second axle can be supplied with power both by the electric motor of the electric drive unit and, via the cardan shaft and the friction clutch, by the first drive unit.

Overall, it is preferred if the electric drive unit is arranged between the transverse differential of the second axle and a friction clutch.

This results in a structure of simple design since the design of the friction clutch as a hang-on coupling, in particular, is easy to implement.

In the present context, the term "hang-on coupling" shall preferably be interpreted to mean a friction clutch which can be operated either open, closed or in slip mode.

Overall, it is furthermore preferred if the electric motor, a planetary gearset and the shift clutch package are arranged in this order, starting from the transverse differential of the second axle.

This results in good weight distribution and comparatively simple connection of the shift clutch package to the output of the electric drive unit.

According to another preferred embodiment, a planetary gearset is arranged between the electric motor and the shift clutch package.

By means of a planetary gearset, it is a comparatively simple matter to set up a different transmission ratio between the first transmission ratio and the second transmission ratio. Moreover, it is a simple matter in terms of design to arrange a planetary gearset coaxially with the electric machine and the shift clutch package.

It is thus preferred, for example, if a sun gear of a planetary gearset is connected to an output shaft of the electric motor.

It is furthermore advantageous if the first shift clutch is designed to connect a member, such as a planet carrier, of a planetary gearset to the output of the electric drive unit.

In this embodiment, the first transmission ratio can consequently be set up by means of the gears of the planetary gearset.

According to another preferred embodiment, the second shift clutch is designed to connect an output shaft of the electric motor to the output of the electric drive unit.

In this embodiment, the second transmission ratio is consequently set up as a direct transmission ratio between the output shaft of the electric motor and the output of the electric drive unit.

This reduces the effort involved in the design.

It is also preferred if the first and/or the second shift clutch is a dog clutch with a sliding sleeve, which can be moved in a longitudinal direction.

This enables the shift clutch package to be constructed in a mechanically simple way. The first and the second shift clutch are preferably synchronized by means of the electric motor.

It is also advantageous if the first and/or the second shift clutch is actuated by means of an associated electromagnetic actuator.

In this embodiment, it is advantageous that the actuation of the shift clutches does not require hydraulic units or a separate electric motor, which would require a large amount of installation space in the radial direction in the region of the shift clutch package.

An electromagnetic actuator is disclosed in document WO2007/085348 A1, for example. The disclosure of this document shall be included here by way of reference.

According to another preferred embodiment, the first and the second shift clutch are locked with respect to one another by a mechanical locking device.

It is thereby possible to ensure that simultaneous set-up of the first and the second transmission ratio is excluded. This embodiment is advantageous especially when using electromagnetic actuators, since it is thereby also possible to exclude electronic actuating errors.

It is particularly advantageous here if the mechanical locking device engages on sliding sleeves of the first and the second shift clutch.

In this way, it is possible to implement the mechanical locking device in a manner which is particularly advantageous in terms of design.

It is furthermore preferred here if the sliding sleeves each have an axially extending longitudinal portion, said portions being arranged radially one inside the other, at least one locking element being arranged in a space present between the longitudinal portions.

In this way, it is possible to implement the locking device in a manner which is simple in terms of design, and to do so with a small number of components.

It is particularly advantageous here if the locking element is designed as a ball, and at least one of the longitudinal portions has formed on it a radial recess into which the ball can be pushed in order to lock the associated sliding sleeve axially.

According to an alternative embodiment, the mechanical locking device has a locking rocker, which is pivoted when one sliding sleeve is moved and, in the process, engages on the other sliding sleeve in order to lock the other sliding sleeve axially.

An axis of rotation of the locking rocker is preferably aligned transversely to the direction of actuation of the sliding sleeves.

According to a second aspect of the present invention, the above object is achieved by a shift clutch arrangement for connecting two rotational bodies that can be rotated relative to one another, such as an output shaft of the electric motor and an output of the electric drive unit, the shift clutch arrangement having:

- a sliding sleeve, which is connected in a rotationally fixed manner to the first rotational body and is supported on the first rotational body in such a way that it can be moved axially between a closed position and an open position;
- a coupling body, which is connected in a rotationally fixed manner to the second rotational body and into which the sliding sleeve can be pushed axially in the closing direction in order to connect the second rotational body to the first rotational body in the direction of rotation in the closed position; and
- an electromagnetic actuator arrangement for moving the sliding sleeve axially, the electromagnetic actuator arrangement having an annular magnet housing with two annular limbs pointing radially inwards, each of which can be coupled magnetically via an air gap to a pole body, a magnetic sensor, such as a Hall-effect sensor, designed to detect a stray magnetic field extending axially out of the air gap being arranged adjacent to the air gap on at least one of the annular limbs.

With the shift clutch arrangement according to the invention it is possible to detect a shift state of the shift clutch in a comparatively simple manner, namely by detecting a stray magnetic field extending axially out of the air gap. It is accordingly possible to make the electromagnetic actuator compact in the radial direction and to provide it with small air gaps, thus increasing efficiency.

A drive train in accordance with the first aspect of the invention is preferably fitted with a shift clutch arrangement in accordance with the second aspect of the invention.

It goes without saying that the features mentioned above and those which remain to be explained below can be used not only in the respectively indicated combination but also in other combinations or in isolation without exceeding the scope of the present invention.

BRIEF DESCRIPTION OF THE SEVERAL VIEWS OF THE DRAWING

Illustrative embodiments of the invention are shown in the drawing and are explained in greater detail in the following description. In the drawing:

FIG. 5 shows a schematic representation of a shift clutch package of an electric drive unit of a drive train according to the invention, the shift clutch package being fitted with a mechanical locking device;

FIG. 6 shows the locking device in FIG. 5 in a first locking position;

FIG. 7 shows the locking device in FIG. 5 in a second locking position;

FIG. 8 shows an alternative embodiment of a locking device for a shift clutch package of an electric drive unit of a drive train according to the invention;

DETAILED DESCRIPTION OF THE INVENTION

Figure 1:
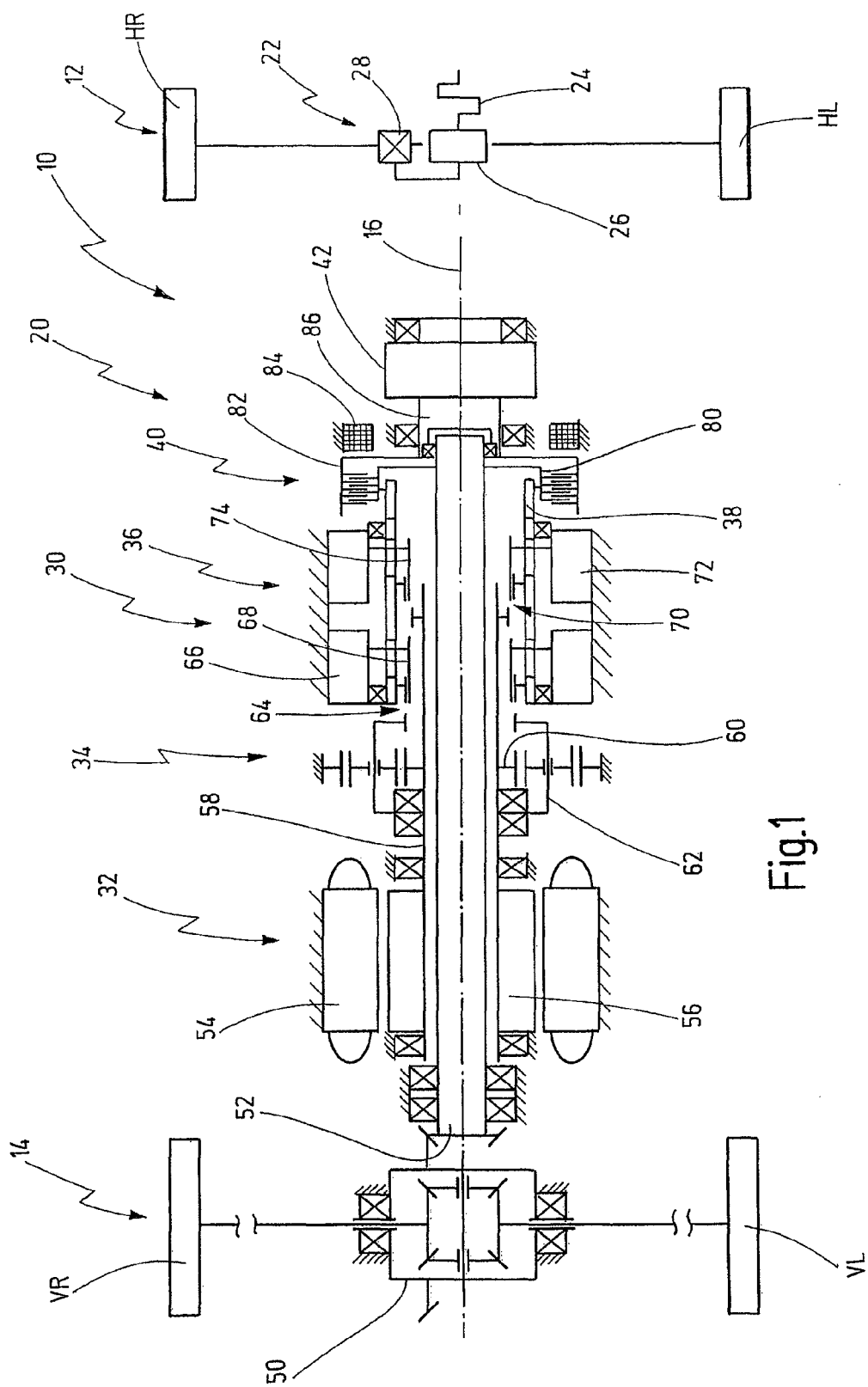
FIG. 1 shows a schematic representation of a drive train in accordance with a first embodiment of the present invention.

In FIG. 1, a vehicle in the form of a passenger vehicle is denoted overall by 10.

The motor vehicle 10 has a first axle 12 (in the present case a rear axle) with rear wheels HR, HL and a second axle 14 (in the present case a front axle) with wheels VR, VL. However, it is also possible for the first axle to be the front axle and the second axle to be the rear axle. A longitudinal axis of the vehicle is shown at 16.

The motor vehicle 10 is fitted with a drive train 20, which has a first drive unit 22 arranged in the region of the first axle 12. The first drive unit 22 has a drive motor 24 (e.g. an internal combustion engine) and a step-change transmission 26, the output of which is connected to a first transverse differential 28. The first transverse differential 28 distributes the drive power from the first drive unit 22 to the wheels HR, HL.

The drive train 20 furthermore has an electric drive unit 30 arranged in the region of the second axle 14. Overall, the electric drive unit 30 is aligned parallel to the longitudinal axis 16 and contains an electric motor 32, a planetary gearset 34 and a shift clutch package 36, which are arranged axially adjacent to one another in this order, starting from the second axle 14. The electric drive unit 30 furthermore has a single output 38, which is situated on the opposite side of the second axle 14.

The drive train 20 furthermore contains a friction clutch 40 and an oil pump 42, which are associated with the electric drive unit 30. The friction clutch 40 is arranged between the electric drive unit 30 and the oil pump 42.

The drive train 20 has no cardan shaft. On the contrary, the first axle 12 is driven by means of the first drive unit 22, and the second axle 14 is driven exclusively by means of the electric drive unit 30.

The second axle 14 has a second transverse differential 50, which, in the present case, is designed as a bevel gear differential. A drive gear of the second transverse differential 50 is in engagement with a pinion, which is formed at one end of an input shaft 52 for the second transverse differential 50. The input shaft 52 extends axially from the second transverse differential 50, through the electric drive unit 30, approximately as far as a region between the friction clutch 40 and the oil pump 42.

The electric motor 32 has a stator 54 and a rotor 56, which is connected to an output shaft 58. The output shaft 58 is designed as a hollow shaft surrounding the input shaft 52 and extends away from the second transverse differential 50 in one direction, as far as the shift clutch package 56.

Arranged in-between is the planetary gearset 34, and a sun gear 60 of the planetary gearset 34 is connected to the output shaft 58 of the electric motor 32. An annulus of the planetary gearset 34 is fixed on the housing. A planet carrier 62 of the planetary gearset 34 is supported rotatably in relation to the output shaft 58 and can be connected to the output 38 via a first shift clutch 64 of the shift clutch package 36. The first shift clutch 64 is assigned a first electromagnetic actuator arrangement 66, which is designed to move a first sliding sleeve 68 in the axial direction (parallel to the longitudinal axis 16). The first sliding sleeve 68 is connected in a rotationally fixed manner to the output 38 (which can be designed as a hollow shaft surrounding the output shaft 58) but is supported in such a way that it can be moved axially. In a first position (closed position), the first sliding sleeve 68 is offset towards the left from the position shown in FIG. 1, with the result that it is in engagement with a tooth system (coupling body), not designated specifically, of the planet carrier 62 in order in this way to connect the planet carrier 62 in a rotationally fixed manner to the output 38.

In the position shown in FIG. 1 (the open position), the output 38 is decoupled from the planet carrier 62.

The shift clutch package 36 has a second shift clutch 70, which can be actuated by means of a second electromagnetic actuator arrangement 72. The second shift clutch 70 has a second sliding sleeve 74, which is likewise supported on the output 38 in such a way that it is rotationally fixed but can be moved axially. In the position shown in FIG. 1 (open position), the second sliding sleeve 74 is decoupled from a tooth system (not designated specifically) on the output shaft 58 of the electric motor 32. If the second electromagnetic actuator arrangement 72 is activated to move the second sliding sleeve 74 to the left, the said sleeve enters into engagement with the tooth system on the output shaft 58 in order in this way to connect the output shaft in a rotationally fixed manner to the output 38.

The friction clutch 40 is designed as a multi-plate clutch and has an inner plate carrier 80 and an outer plate carrier 82. The inner plate carrier is connected to the output 38 and to the input shaft 52 of the second transverse differential 50, specifically in the region of the friction clutch 40 when viewed axially.

The outer plate carrier 82 is connected to a drive shaft 86 for the oil pump 42.

Also shown, at 84, is a clutch actuator, which is generally closed during the operation of the electric drive unit 30 in the present embodiment in order in this way to ensure an appropriate supply of fluid to the electric drive unit 30 during the operation of the electric motor 32.

In the present embodiment, the output 38 could also be connected rigidly to the drive shaft 86. In the present case, the friction clutch 40 is depicted because the friction clutch can also be used as a hang-on coupling in certain versions of the drive train 20 shown.

The drive train 20 operates as follows: the first axle 12 is driven permanently in a manner known per se by the first drive unit 22. The first drive unit 22 is the main drive unit of the motor vehicle 10. If required, the second axle 14 is driven (e.g. if slip occurs between the first axle 12 and the second axle 14). Depending on the speed range of the motor vehicle, the drive power of the electric motor 32 is therefore transmitted to the input shaft 52 and consequently to the input of the second transverse differential 50 either via the first shift clutch 64, by means of which a first transmission ratio between the output shaft 58 and the output 38 is set up, or via the second shift clutch 70 (by means of which a second transmission ratio between the output shaft 58 and the output 38 is set up).

In general terms, when the first drive unit 22 is switched off a driving mode involving only the electric drive unit 30 is also possible.

Although this is not shown in FIG. 1, it goes without saying that the electric drive unit 30 is assigned a suitable energy storage device and a suitable control unit (not shown). Accordingly, it is possible to implement a purely electric driving mode using the electric energy storage device. During operation, it is also possible to operate the electric motor 32 as a generator in order to recharge the electric energy storage device while underway.

By providing a shift clutch package 36 with two shift clutches 64, 70, by means of which two different transmission ratios can be set up, it is possible to use the electric drive unit 30 in parallel with the first drive unit 22 over a large speed range of the motor vehicle.

Figure 2:
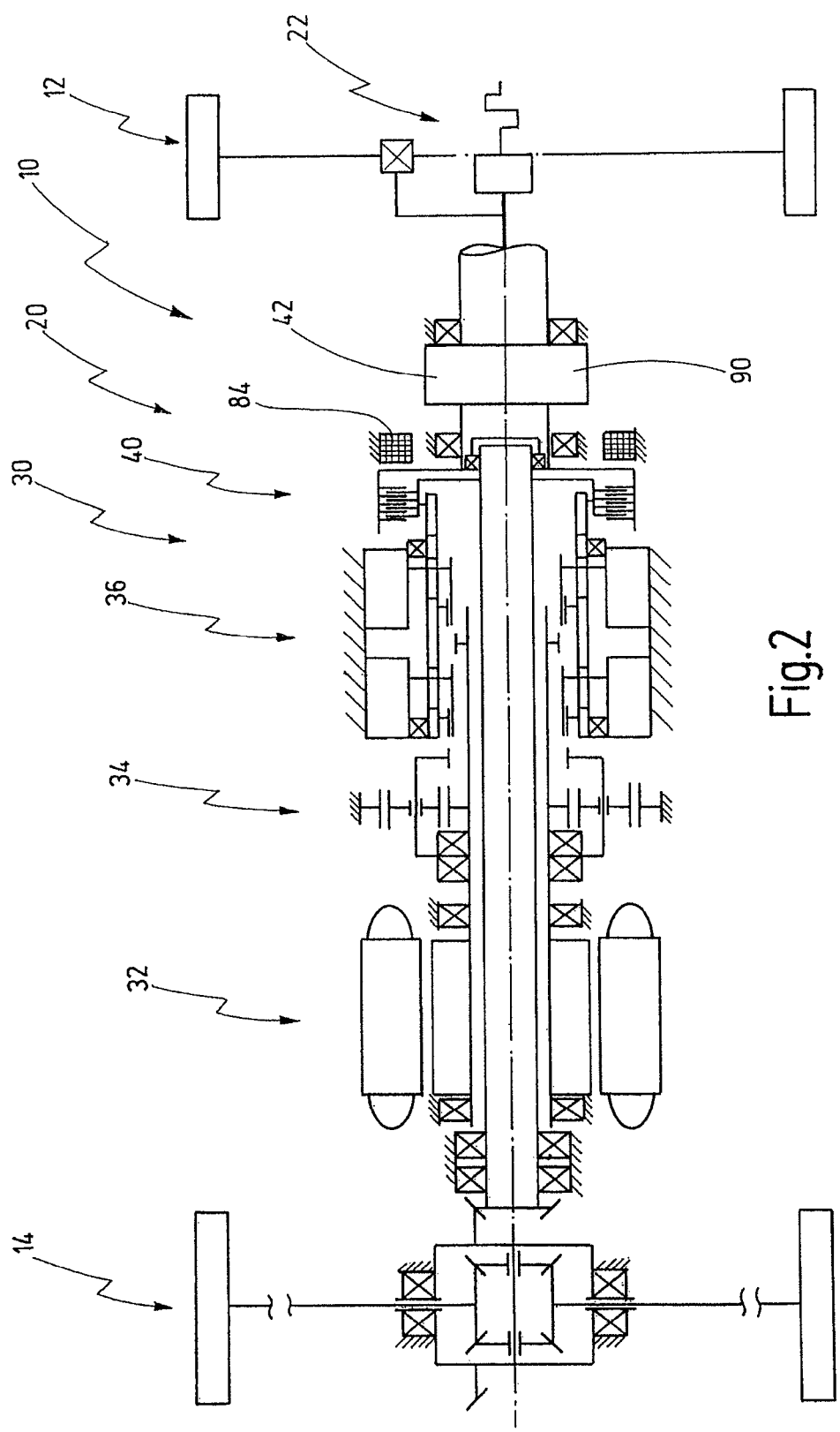
FIG. 2 shows a modification of the drive train in FIG. 1.
Figure 3:
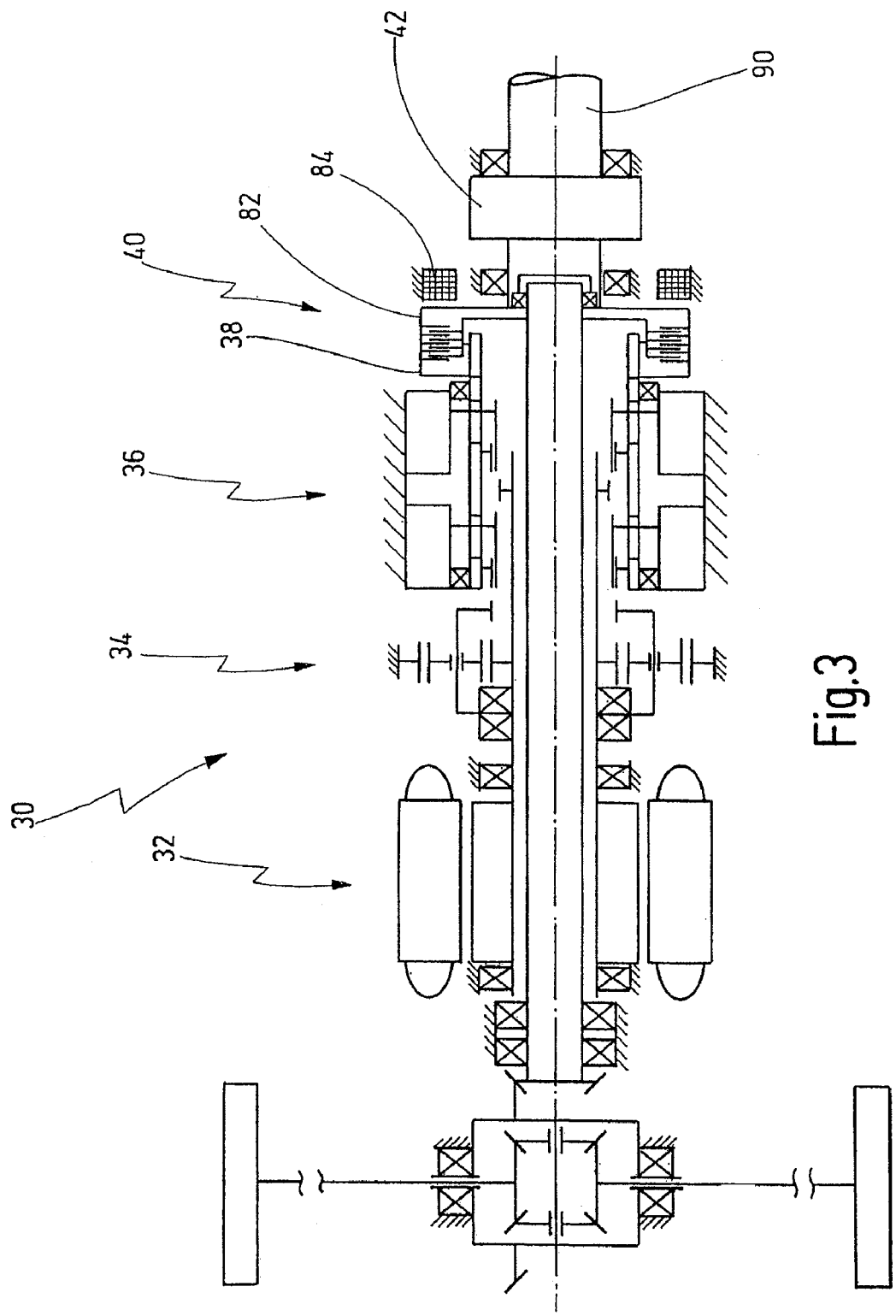
FIG. 3 shows a modification of the drive train in FIG. 1.
Figure 4:
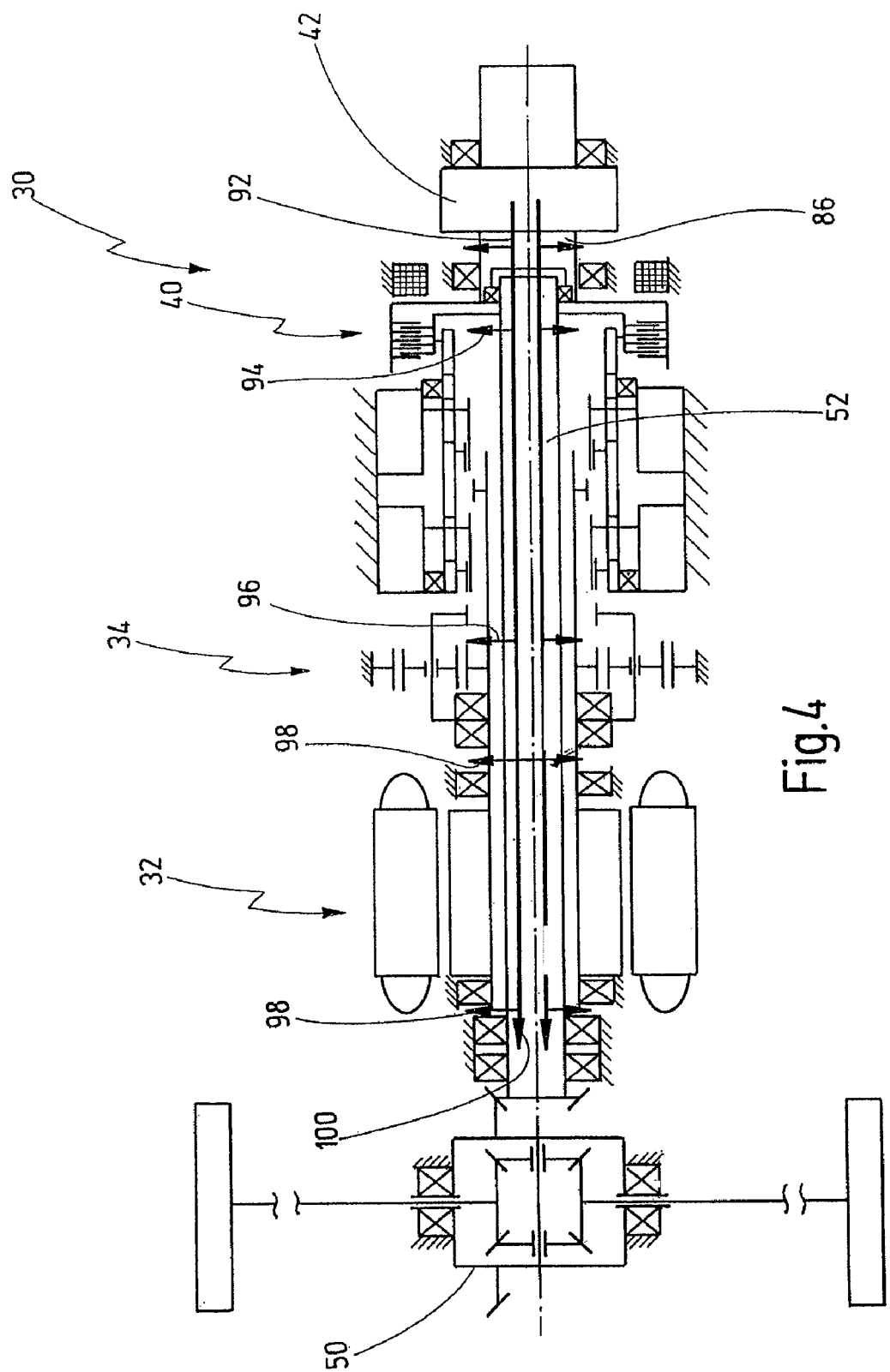
FIG. 4 shows a schematic representation of the fluid supply of an electric drive unit of a drive train according to the invention.

The following figures, FIGS. 2 to 4, show modifications of the drive train 20 described with reference to FIG. 1. Overall, these modifications have the same structure and the same mode of operation as the drive train in FIG. 1. Identical elements are therefore provided with the same reference signs. Only the differences are explained below.

In the case of the drive train 20 in FIG. 2, an output of the first drive unit 22 is connected to the electric drive unit 30 via a cardan shaft 90. In this case, the cardan shaft 90 also forms a drive shaft 86 for the oil pump 42.

Here, the friction clutch 40 can be open in the normal case. In this case, drive power from the first drive unit 22 can be transmitted exclusively to the first axle 12. In parallel, drive power from the electric drive unit 30 can be transmitted to the second axle 14.

Mechanical drive power can furthermore also be transmitted from the first drive unit 22 to the second axle 14, specifically by closing the friction clutch 40. In this case, the friction clutch 40 is designed as a hang-on coupling and is closed when required (e.g. when a rotational speed difference occurs between the first axle 12 and the second axle 14). In this case, the friction clutch 40 can also be operated with slip.

In this embodiment, it is furthermore also possible for drive power to be fed into the output as supplementary power by the electric drive unit 30, the output power of the electric motor 32 being transmitted predominantly to the second axle 14 in this case. However, this depends decisively on how the first drive unit 22 and the electric drive unit 30 are activated in relation to one another.

FIG. 3 shows another modification of the drive train 20 shown in FIG. 1. In this embodiment too, an output of the first drive unit 22 can be connected via a cardan shaft 90 to the input shaft 52 of the second transverse differential 50, specifically via the friction clutch 40. In this case, however, the output 38 of the electric drive unit 30 is connected rigidly to the outer plate carrier 82 and consequently to the cardan shaft 90, whereas the inner plate carrier 80 is connected rigidly to the input shaft 52.

In this case, the electric drive unit 30 can also transmit drive power to the first axle 12. In this case, the electric motor 32 can be used to start the internal combustion engine 24, for example.

It is furthermore possible, by means of the friction clutch 40, to set up an all-wheel functionality, in which the sum of the powers of the electric drive unit 30 and the first drive unit 22 is transmitted to the input shaft 52 of the second transverse differential 50 via the friction clutch 40.

The electric motor 32 can furthermore be used to optimize efficiency, in particular when an internal combustion engine is used as drive motor 24. This is because the electric motor 32 can be used to shift the load point in the internal combustion engine 24. Here, the internal combustion engine 24 is operated in a more favourable efficiency range, and the excess power is fed at least in part to the energy storage device of the vehicle (drive battery for the electric motor 32) via the electric motor 32. It goes without saying that the electric motor 24 operates as a generator during this process. In the embodiment in FIG. 3, this optimization of efficiency can take place in an optimum manner since the power flow takes place completely via the cardan shaft 90. More generally, this kind of optimization of efficiency is also possible in the embodiments in FIGS. 1 and 2. In these embodiments, the power flow can take place at least in part by tyre/road contact (in each case with friction clutch 40 partially open). In the embodiments in FIGS. 1 and 2, optimization of efficiency consequently takes place at the expense of tyre/road contact.

FIG. 4 shows an example of how the electric drive unit 30 can be supplied with a fluid (e.g. lubricating oil). Here, the fluid supply in the versions shown in FIGS. 1 and 3 can in each case be identical.

The region of the electric motor 32 is generally kept "dry", for which purpose the bearings of the output shaft 58, which are shown on the left-hand and the right-hand side, are provided with suitable seals. Depending on the design of the drive train 20 and of the electric drive unit 30, the motor compartment of the electric motor 32 can also be embodied as a wet space, however.

Appropriate oil ducts 92 are formed in the shaft 90/86 and in the input shaft 52, starting from the oil pump 42. Via these oil ducts 92, lubricant can be injected into the friction clutch 40 and the planetary gearset 34 (as shown at 94 and 96 respectively). At 98, the figure shows that lubricant can also be injected into the bearings of the output shaft 58.

At 100, the figure shows that fluid can furthermore be pumped by means of the oil pump 42 to the second transverse differential 50, in which there is generally oil bath lubrication. The bevel drive of the second transverse differential 50 and, if appropriate, a differential-side bearing for the input shaft 52, can also be provided with oil bath lubrication in this way.

The shift clutch package 36 is shown in schematic form in FIG. 5, the figure showing that actuation of the first shift clutch 64 and of the second shift clutch 70 can be locked with respect to one another by means of a locking device 104. For this purpose, the first sliding sleeve 68 has a first longitudinal portion 106. The second sliding sleeve 74 has a second longitudinal portion 108. The longitudinal portions 106, 108 are aligned axially with one another and have an interspace within which a locking element, in the form of a ball 113 for example, is arranged. A first radial recess 110 is formed on the radial inner circumference of the outer longitudinal portion 106. A second radial recess 112 is formed on the radial outer circumference of the inner longitudinal portion 108. In general, the locking element 113 is supported so as to be fixed in the axial direction but movable in the radial direction by a guide sleeve of the shift clutch package 36 or by means of a guide element 114 revolving with the shaft and/or the sliding sleeves.

FIG. 6 shows that the locking element 113 is pressed into the first radial recess 110 when the second sliding sleeve 74 is moved to the left. The first sliding sleeve 68 is thereby locked in the axial direction.

FIG. 7 shows that the locking element 113 is pressed into the second radial recess 112 in order to lock the second sliding sleeve 74 when the first sliding sleeve 68 is moved in the axial direction.

FIG. 8 shows an alternative form of a locking device 104, which is achieved by means of a locking rocker 116. In this case too, the first sliding sleeve 68 has a first portion 106, which is assigned to one arm of the locking rocker 116. The second sliding sleeve 74 has a second portion 108, which is assigned to the second arm of the locking rocker 116. As soon as one of the sliding sleeves 68, 74 is moved, the locking rocker 116 is pivoted, specifically about a rotational or rocker axis 118 between the arms, which is aligned transversely to the axial direction. The respective other sliding sleeve is thereby locked.

Figure 9:
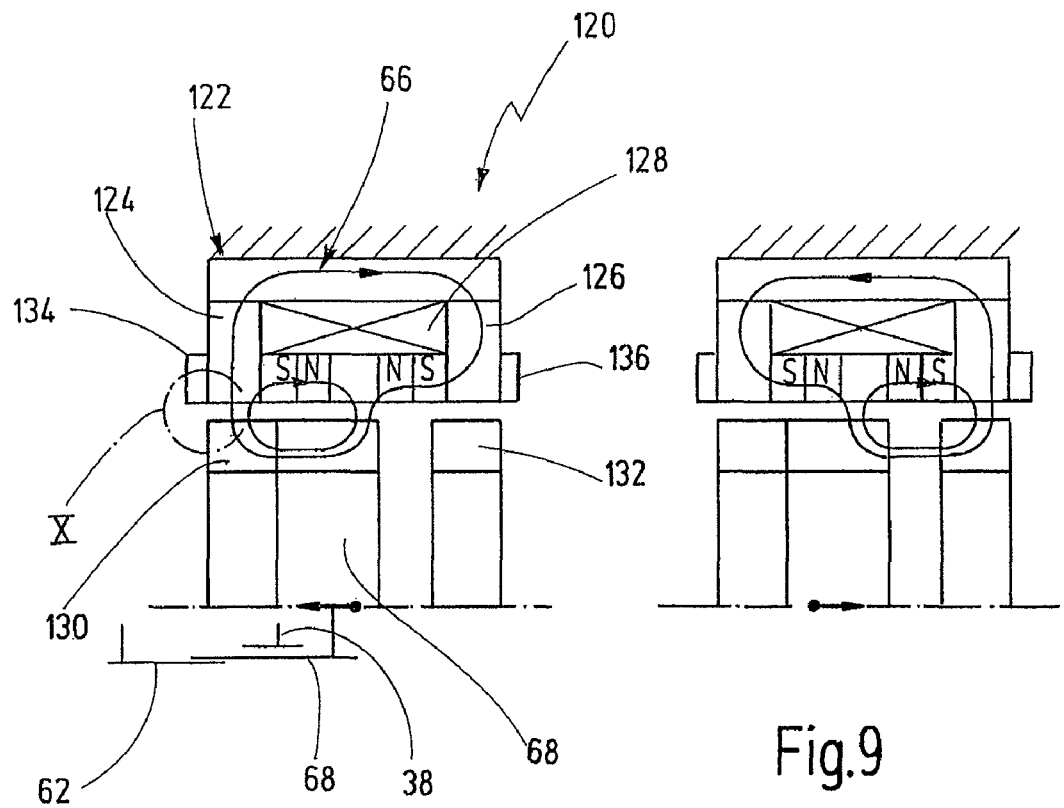
FIG. 9 shows a schematic representation of a shift clutch arrangement according to the invention in two different activation states.
Figure 10:
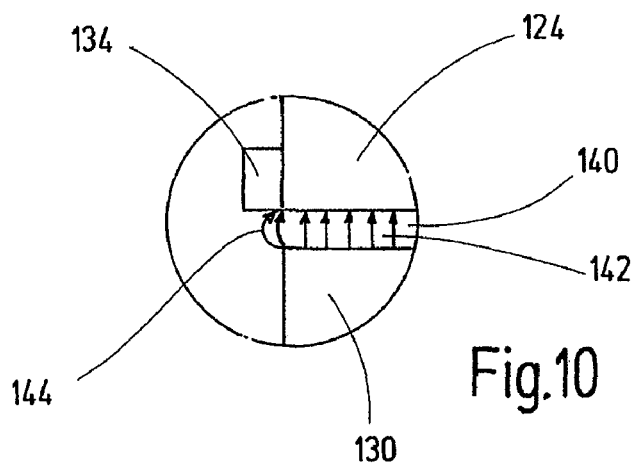
FIG. 10 shows a detail X of FIG. 9.

FIGS. 9 and 10 show a shift clutch arrangement in accordance with the second aspect of the present invention. The shift clutch arrangement can be designed as a first shift clutch 64 or as a second shift clutch 70, for example (in the present case, the reference signs for the first shift clutch 64 are used).

The shift clutch arrangement 120 shown in FIGS. 9 and 10 has a generally annular magnet housing 122, which has a first annular limb 124 and a second annular limb 126, between which a coil 128 of an electromagnetic actuator is arranged. Two permanent magnets are furthermore arranged in the interspace. Depending on the direction of current in the coil 128, a sliding sleeve 68 is moved either to the left (as shown on the left in FIG. 9) or to the right (as indicated by the arrow on the right-hand side of FIG. 9).

As in the embodiment in FIGS. 1 to 3, the sliding sleeve can be supported on a shaft, such as an output of an electric drive unit, in such a way that it can be moved axially, and it can enter into engagement with a second rotational body (e.g. the planet carrier 62 or, alternatively, a free gear of a spur gearset).

The shift clutch arrangement 120 furthermore has a first pole body 130 and a second pole body 132, between which an armature portion of the sliding sleeve 68 can be moved axially.

Respective magnetic sensors 134, 136 in the form of Hall-effect sensors are provided on the axially opposite sides of the annular limbs 124, 126. These serve to monitor the selected position of the shift clutch arrangement 120, specifically by monitoring a stray magnetic field. Here, the Hall-effect sensors 134, 136 are fixed to the housing, like the magnet housing 122, whereas the pole bodies 130, 132 and the sliding sleeve 68 can rotate.

FIG. 10 shows that an air gap 140, within which a magnetic field 142 propagates in order to close a magnetic circuit, is set up between a radially inner end of an annular limb 124 and a radially outer surface of the pole body 130. In this arrangement, a stray magnetic field 144, which can be detected by the magnetic sensor 134, is obtained at the axially outer edge.

A magnetic flux between annular limb 124 and pole body 130 is set up on the left-hand side of FIG. 9, for example, and this can be detected by the associated magnetic sensor 134 (by way of the stray magnetic field 144). On the other hand, no magnetic flux is set up between the second annular limb 126 and the second pole body 132, and this can be detected by the second magnetic sensor 136.

When the polarity of the coil is reversed, a magnetic circuit like that shown on the right-hand side of FIG. 9 is obtained, for example. As a result, the sliding sleeve 68 is moved to the right, as indicated by an arrow in FIG. 9 (FIG. 9 still shows the initial state before the movement to the right). If the sliding sleeve 68 is in the right-hand end position with the coil deenergized, the profile of the magnetic field lines is similar to that shown in the right-hand image in FIG. 9. In this case, it is possible, for example, for the magnetic field produced by the permanent magnet or magnets to be detected.

This state too can be detected by the magnetic sensors 134, 136, enabling the shift position (end position) to be unambiguously detected by means of the magnetic sensors 134, 136.

A shift clutch arrangement 120 of the type shown in FIGS. 9 and 10 is preferably employed for each shift clutch 64, 70 of the electric drive unit 30 in FIGS. 1 to 3.

It goes without saying here that the electromagnetic actuator arrangement shown in FIGS. 9 and 10 is to be interpreted as being only an example. Alternative embodiments of such electromagnetic actuator arrangements are disclosed in document WO2007/085348 A1, the disclosure of which shall be included here by way of reference.

Axially outer magnetic sensors 134, 136, which detect a stray magnetic field 144 extending axially out of an air gap 140, can also be used in the other versions of electromagnetic actuator arrangements shown there.

What is claimed is:

1. Drive train for a motor vehicle which has a first and a second axle, said drive train having a first drive unit for permanently driving the first axle and an electric drive unit, which is arranged in the region of the second axle and has an electric motor and a shift clutch package, which contains a first shift clutch for setting up a first transmission ratio and a second shift clutch for setting up a second transmission ratio between the electric motor and an output of the electric drive unit, the electric drive unit being arranged coaxial with an input shaft of a transverse differential of the second axle, wherein a sun gear of a planetary gearset is connected to an output shaft of the electric motor, wherein the first shift clutch is designed to connect a member of the planetary gearset to the output of the electric drive unit, and wherein the second shift clutch is designed to connect an output shaft of the electric motor to the output of the electric drive unit.

2. Drive train according to claim 1, in which the output of the electric drive unit is connected in a rigid or torsionally rigid manner to the input shaft of the transverse differential.

3. Drive train according to claim 2, in which the output of the electric drive unit is connected via a coupling to an oil pump for supplying fluid to the electric drive unit.

4. Drive train according to claim 1, in which the output of the electric drive unit can be connected via a friction clutch to the input shaft of the transverse differential.

5. Drive train according to claim 1, in which the output of the electric drive unit is connected via a friction clutch to a cardan shaft, which is connected to the first drive unit.

6. Drive train according to claim 1, in which the electric drive unit is arranged between the transverse differential of the second axle and a friction clutch.

7. Drive train according to claim 1, in which the electric motor, a planetary gearset and the shift clutch package are arranged in this order, starting from the transverse differential of the second axle.

8. Drive train according to claim 1, in which a planetary gearset is arranged between the electric motor and the shift clutch package.

9. Drive train according to claim 1, in which the first and/or the second shift clutch is a dog clutch with a sliding sleeve, which can be moved in a longitudinal direction.

10. Drive train according to claim 1, in which at least one of the first and the second shift clutch is actuated by means of an associated electromagnetic actuator.

11. Drive train for a motor vehicle which has a first and a second axle, said drive train having a first drive unit for permanently driving the first axle and an electric drive unit, which is arranged in the region of the second axle and has an electric motor and a shift clutch package, which contains a first shift clutch for setting up a first transmission ratio and a second shift clutch for setting up a second transmission ratio between the electric motor and an output of the electric drive unit, the electric drive unit being arranged coaxial with an input shaft of a transverse differential of the second axle, wherein the first and the second shift clutch are locked with respect to one another by a mechanical locking device, wherein the mechanical locking device engages on sliding sleeves of the first and second shift clutches and wherein the sliding sleeves each have an axially extending longitudinal portion, said portions being arranged one inside the other, and in which at least one locking element is arranged in a space present between the longitudinal portions.

12. Drive train according to claim 11, in which the locking element is designed as a ball, and at least one of the longitudinal portions has formed on it a radial recess into which the ball can be pushed in order to lock the associated sliding sleeve axially.

13. Drive train according to claim 11, in which the mechanical locking device has a locking rocker, which is pivoted when one sliding sleeve is moved and, in the process, engages on the other sliding sleeve in order to lock the other sliding sleeve axially.

14. Drive train for a motor vehicle which has a first and a second axle, said drive train having a first drive unit for permanently driving the first axle and an electric drive unit, which is arranged in the region of the second axle and has an electric motor and a shift clutch package, which contains a first shift clutch for setting up a first transmission ratio and a second shift clutch for setting up a second transmission ratio between the electric motor and an output of the electric drive unit, the electric drive unit being arranged coaxial with an input shaft of a transverse differential of the second axle, wherein the electric motor a planetary gearset and the shift clutch package are arranged in this order, starting from the transverse differential of the second axle.

15. Drive train according to claim 14, in which the output of the electric drive unit is connected in a rigid or torsionally rigid manner to the input shaft of the transverse differential.

16. Drive train according to claim 15, in which the output of the electric drive unit is connected via a coupling to an oil pump for supplying fluid to the electric drive unit.

17. Drive train according to claim 16, in which the output of the electric drive unit can be connected via a friction clutch to the input shaft of the transverse differential.

* * * * *